US011676005B2

(12) United States Patent
Nezhadarya et al.

(10) Patent No.: US 11,676,005 B2
(45) Date of Patent: Jun. 13, 2023

(54) METHOD AND SYSTEM FOR DEEP NEURAL NETWORKS USING DYNAMICALLY SELECTED FEATURE-RELEVANT POINTS FROM A POINT CLOUD

(71) Applicants: Ehsan Nezhadarya, Thornhill (CA); Ehsan Taghavi, Toronto (CA); Bingbing Liu, Singapore (SG)

(72) Inventors: Ehsan Nezhadarya, Thornhill (CA); Ehsan Taghavi, Toronto (CA); Bingbing Liu, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 943 days.

(21) Appl. No.: 16/191,011

(22) Filed: Nov. 14, 2018

(65) Prior Publication Data
US 2020/0151557 A1    May 14, 2020

(51) Int. Cl.
*G06N 3/08*    (2023.01)
(52) U.S. Cl.
CPC ........................... *G06N 3/08* (2013.01)
(58) Field of Classification Search
None
See application file for complete search history.

(56) References Cited

U.S. PATENT DOCUMENTS

| 10,970,553 B2* | 4/2021 | Zhang | G01S 7/4808 |
| 2009/0313287 A1* | 12/2009 | Koralski | G06F 40/18 |

(Continued)

FOREIGN PATENT DOCUMENTS

| CN | 108171748 A | 6/2018 |
| CN | 108415032 A | 8/2018 |

(Continued)

OTHER PUBLICATIONS

Qi et al. PointNet: Deep Learning on Point Sets for 3D Classification and Segmentation. arXiv. Apr. 10, 2017. [retrieved from internet on Sep. 21, 2021] <URL: https://arxiv.org/pdf/1612.00593.pdf> (Year: 2017).*

(Continued)

*Primary Examiner* — Bion A Shelden

(57) ABSTRACT

Methods and systems for deep neural networks using dynamically selected feature-relevant points from a point cloud are described. A plurality of multidimensional feature vectors arranged in a point-feature matrix are received. Each row of the point-feature matrix corresponds to a respective one of the multidimensional feature vectors, and each column of the point-feature matrix corresponds to a respective feature. Each multidimensional feature vector represents a respective unordered point from a point cloud and each multidimensional feature vector includes a respective plurality of feature-correlated values, each feature-correlated value represents a correlation extent of the respective feature. A reduced-max matrix having a selected plurality of feature-relevant vectors is generated. The feature-relevant vectors are selected by, for each respective feature, identifying a respective multidimensional feature vector in the point-feature matrix having a maximum feature-correlated value associated with the respective feature. The reduced-max matrix is output to at least one neural network layer.

20 Claims, 8 Drawing Sheets

(56) References Cited

U.S. PATENT DOCUMENTS

| | | | | |
|---|---|---|---|---|
| 2017/0220876 | A1* | 8/2017 | Gao | G06K 9/3241 |
| 2018/0268256 | A1* | 9/2018 | Di Febbo | G06K 9/6273 |
| 2019/0080483 | A1* | 3/2019 | Mammou | H04N 19/90 |
| 2019/0108639 | A1* | 4/2019 | Tchapmi | G06T 7/143 |

FOREIGN PATENT DOCUMENTS

| | | |
|---|---|---|
| CN | 108596961 A | 9/2018 |
| EP | 3340106 A1 | 6/2018 |

OTHER PUBLICATIONS

Chen et al. Fast Resampling of 3D Point Clouds via Graphs. arXiv. Feb. 11, 2017. [retrieved from internet on Sep. 21, 2021]. <URL: https://arxiv.org/pdf/1702.06397.pdf> (Year: 2017).*

B. Son. Experiment on Visualizing PointNet. [comitted to github on Jan. 7, 2018] [retrieved on Aug. 26, 2022] <URL: https://github.com/GitBoSun/PointNet_vis/blob/master/Desktop/DeepLearning/pointnet_vis/pointnet.pdf> (Year: 2018).*

DSMS. DataScience Made Simple. sort the dataframe in python pandas by index. [archived on Jun. 28, 2018] [retrieved on Aug. 26, 2022] <URL: https://web.archive.org/web/20180628081542/http://www.datasciencemadesimple.com/sort-the-dataframe-in-python-pandas-by-index/> (Year: 2018).*

DSMS. DataScience Made Simple. Delete or Drop the duplicate row of a dataframe in python pandas. [archived on May 8, 2018] [retrieved on Aug. 26, 2022] <URL: https://web.archive.org/web/20180508200531/https://www.datasciencemadesimple.com/delete-drop-duplicate-row-dataframe-python-pandas/> (Year: 2018).*

Nezhadarya et al. Adaptive Hierarchical Down-Sampling for Point Cloud Classification. arXiv. Apr. 11, 2019. [retrieved on Aug. 26, 2022] <URL: https://arxiv.org/pdf/1904.08506v1.pdf> (Year: 2019).*

Chen Jingdao et al: "Sampled-Point Network for Classification ofDeformed Building Element Point Clouds", 2018 IEEE International Conference on Robotics and Automation (ICRA), IEEE, May 21, 2018 (May 21, 2018), pp. 2164-2169.

Zheng Jian et al: "Robust Attentional Pooling via Feature Selection", 2018 24th International Conference on Pattern Recognition (ICPR), IEEE, Aug. 20, 2018 (Aug. 20, 2018), pp. 2038-2043.

* cited by examiner

```
 1: function (F_o, f_o, suidx) = CRITICALPOINTSLAYER(F_s, F_i, k)
 2:     np_in = nrows(F_i), np_out = round(np_in/k)
 3:     for i = 0 to ncols(F_s) − 1 do
 4:         idx[i] = argmax(F_s[:, i])        ← 401
 5:     end for
 6:     idx = sort(idx)                        ← 403
 7:     uidx = unique(idx)                     ← 402
 8:     ridx = rand(np_out, [0, len(uidx)−1])  ← 404
 9:     suidx = uidx[ridx[:]]
10:     F_o = F_i[suidx[:]; :]
11:     for i = 0 to ncols(F_o) − 1 do
12:         f_o[i] = max(F_o[:, i])
13:     end for
14:     return (F_o, f_o, suidx)
15: end function
```

METHOD AND SYSTEM FOR DEEP NEURAL NETWORKS USING DYNAMICALLY SELECTED FEATURE-RELEVANT POINTS FROM A POINT CLOUD

TECHNICAL FIELD

The present disclosure relates to a deep neural network that includes at least one layer that is applied to dynamically select feature-relevant points from a point cloud.

BACKGROUND

Deep learning, a promising approach to solve challenges in various fields (e.g., computer vision, speech recognition, etc.), is a machine learning method based on learning data representations in artificial intelligence (AI) systems.

Deep learning has been useful in providing discriminative information of ordered data, such as two-dimensional (2D) images having ordered pixels, for object classification tasks.

Three-dimensional (3D) sensors (such as red green blue-depth (RGB-D) cameras, LIDAR sensors, etc.) may capture 3D information about a surrounding environment and generate a set of data points in space that are representative of the captured 3D information. The set of data points in three-dimensional space is generally referred to in the art as a point cloud and is provided by the 3D sensors as 3D data.

However, the 3D data typically is in the form of unordered points having non-uniform sampling density. The point cloud is therefore a set of data points in three-dimensional space with irregular formation, and processing of 3D data usually suffers from irregular sampling issues, such as high computation cost and inaccuracy of object classification.

Accordingly, it would be desirable to provide a solution for applying deep learning to unordered points with effective point feature extraction and high accuracy classification to achieve state-of-the art performance on point cloud data.

SUMMARY

The present disclosure provides methods and systems for dynamically selecting critical points by including at least one critical point layer (CPL) in a deep neural network. The selected critical points may be applied in at least one fully-connected layer (FCL) for classification, in which each of the selected critical points is recognized and classified with respect to boundary and/or location of an object in accordance with different scenarios. In some examples, selecting the critical points takes into consideration weighting or contribution of a different respective critical point, using a weighted CPL (WCPL). In some examples, the methods and systems of the present disclosure may be used in various different applications, such as control of an autonomous vehicle or any other learning-based processing system. Such configuration of the deep neural network may help to improve classification accuracy and may help to lower complexity cost to complete subsequent object classification tasks in different applications.

In some example aspects, the present disclosure describes a method that includes: receiving a plurality of multidimensional feature vectors arranged in a point-feature matrix, each row of the point-feature matrix corresponding to a respective one of the multidimensional feature vectors, and each column of the point-feature matrix corresponding to a respective feature, each multidimensional feature vector representing a respective unordered data point of a point cloud and each multidimensional feature vector including a respective plurality of feature-correlated values, each feature-correlated value representing a correlation extent of the respective feature; generating a reduced-max matrix having a selected plurality of feature-relevant vectors, each row of the reduced-max matrix corresponding to a respective one of the feature-relevant vectors and each column of the reduced-max matrix corresponding to the respective feature; wherein the feature-relevant vectors are selected by, for each respective feature, identifying a respective multidimensional feature vector in the point-feature matrix having a maximum feature-correlated value associated with the respective feature; and outputting the reduced-max matrix for processing by a final convolution layer of a deep neural network.

In any of the preceding aspects/embodiments, the generating may include: generating an index vector containing row indices of the identified multidimensional feature vectors; generating a sampled index vector by sampling the row indices in the index vector to a desired number; and generating the reduced-max matrix using the row indices contained in the sampled index vector.

In any of the preceding aspects/embodiments, the sampling is deterministic, the method may further comprise: prior to the sampling, sorting the row indices contained in the index vector in an ascending order.

In any of the preceding aspects/embodiments, the desired number is predefined for performing batch processing for different respective point clouds.

In any of the preceding aspects/embodiments, at least two identified respective multidimensional feature vectors in the point-feature matrix are identical and correspond to an identical data point, the method further comprises: for the at least two identified respective multidimensional feature vectors corresponding to the identical data point, the generating further comprises: selecting a respective unique row index associated with the at least one identified respective multidimensional feature vector; generating a unique index vector that includes a plurality of respective unique row indices each corresponding to a different respective point; and generating the reduced-max matrix having a selected plurality of feature-relevant vectors based on the unique index vector, wherein the selected feature-relevant vectors are different with respect to each other.

In any of the preceding aspects/embodiments, outputting the reduced-max matrix comprises: providing the reduced-max matrix as input to the final convolution layer, the final convolution layer performing feature extraction on the feature-relevant vectors to obtain a desired number of represented features in each feature-relevant vector; and providing the output of the final convolution layer to an object classification subsystem of the deep neural network to classify the selected plurality of feature-relevant vectors.

In any of the preceding aspects/embodiments, the receiving comprises: receiving a plurality of the unordered data points of the point cloud; generating a plurality of transformed data by applying preliminary spatial transformation and filtering to the received unordered data points; and providing the plurality of transformed data to a convolutional layer of feature extraction subsystem of the deep neural network to generate the plurality of multidimensional feature vectors.

In any of the preceding aspects/embodiments, the plurality of unordered points are captured by LIDAR sensor or red green blue-depth (RGB-D) camera.

In some aspects, the present disclosure describes a method implemented in a deep neural network, the method comprises: receiving a plurality of unordered data points of a point cloud; encoding the plurality of unordered data points using a convolutional layer of the deep neural network to generate a plurality of multidimensional feature vectors arranged in a point-feature matrix, each row of the point-feature matrix corresponding to a respective one of the multidimensional feature vectors, and each column of the point-feature matrix corresponding to a respective feature, the respective multidimensional feature vector represents a respective unordered data point from a point cloud and includes a plurality of feature-correlated values each representing correlation extent of the respective feature; providing the point-feature matrix to a critical point layer (CPL) to: generate a reduced-max matrix having a selected plurality of feature-relevant vectors, each row of the reduced-max matrix corresponding to a respective one of the feature-relevant vectors and each column of the reduced-max matrix corresponding to the respective feature; wherein the feature-relevant vectors are selected by, for each respective feature, identifying a respective multidimensional feature vector in the point-feature matrix having a maximum feature-correlated value associated with the respective feature; and output the reduced-max matrix to a final convolution layer of the deep neural network; and outputting a plurality of classified points by applying the reduced-max matrix to the at least one neural network layer.

In any of the preceding aspects/embodiments, the CPL may be applied to: generate an index vector containing row indices of the identified multidimensional feature vectors; generate a sampled index vector by sampling the row indices in the index vector to a desired number; and generate the reduced-max matrix using the row indices contained in the sampled index vector.

In any of the preceding aspects/embodiments, sampling the row indices in the index vector to a desired number is deterministic sampling, and the CPL may be further applied to: prior to the sampling, sort the row indices contained in the index vector in an ascending order.

In any of the preceding aspects/embodiments, the desired number is predefined for performing batch processing for different respective point clouds In any of the preceding aspects/embodiments, at least two identified respective multidimensional feature vectors in the point-feature matrix are identical and corresponds to an identical point, and the CPL may be further applied to: for the at least two identified respective multidimensional feature vectors corresponding to the identical point, select a respective unique row index associated with the at least one identified respective multidimensional feature vector; set a unique index vector that includes a plurality of respective unique row indices each corresponding to a different respective point; and generate the reduced-max matrix having a selected plurality of feature-relevant vectors based on the unique index vector, wherein the selected feature-relevant vectors are different with respect to each other.

In some aspects, the present disclosure describes a system configured to: receive a plurality of multidimensional feature vectors arranged in a point-feature matrix, each row of the point-feature matrix corresponding to a respective one of the multidimensional feature vectors, and each column of the point-feature matrix corresponding to a respective feature, each multidimensional feature vector representing a respective unordered data point from a point cloud and each multidimensional feature vector including a respective plurality of feature-correlated values, each feature-correlated value representing a correlation extent of the respective feature; generate a reduced-max matrix having a selected plurality of feature-relevant vectors, each row of the reduced-max matrix corresponding to a respective one of the feature-relevant vectors and each column of the reduced-max matrix corresponding to the respective feature; wherein the feature-relevant vectors are selected by, for each respective feature, identify a respective multidimensional feature vector in the point-feature matrix having a maximum feature-correlated value associated with the respective feature; and output the reduced-max matrix for processing by a final convolution layer of a deep neural network.

In any of the preceding aspects/embodiments, the system may be further configured to: generate an index vector containing row indices of the identified multidimensional feature vectors; generate a sampled index vector by sampling the row indices in the index vector to a desired number; and generate the reduced-max matrix using the row indices contained in the sampled index vector.

In any of the preceding aspects/embodiments, the sampling is deterministic, the system may be configured to: prior to the sampling, sort the row indices contained in the index vector in an ascending order.

In any of the preceding aspects/embodiments, the desired number is predefined for performing batch processing for different respective point clouds.

In any of the preceding aspects/embodiments, at least two identified respective multidimensional feature vectors in the point-feature matrix are identical and correspond to an identical point, the system may be further configured to: for the at least two identified respective multidimensional feature vectors corresponding to the identical point, select a respective unique row index associated with the at least one identified respective multidimensional feature vector; generate a unique index vector that includes a plurality of respective unique row indices each corresponding to a different respective point; and generate the reduced-max matrix having a selected plurality of feature-relevant vectors based on the unique index vector, wherein the selected feature-relevant vectors are different with respect to each other.

In any of the preceding aspects/embodiments, the system may be further configured to: provide the reduced-max matrix as input to the final convolution layer of the deep neural network, the final convolution layer performing feature extraction on the feature-relevant vectors to obtain a desired number of represented features in each feature-relevant vector; and provide the output of the final convolution layer to an object classification subsystem of the deep neural network to classify the selected plurality of feature-relevant vectors.

In any of the preceding aspects/embodiments, the system may be further configured to: receive a plurality of the unordered data points of the point cloud; generate a plurality of transformed data by applying preliminary spatial transformation and filtering to the received unordered data points; and encode the plurality of transformed data to a convolutional layer of feature extraction subsystem of the deep neural network to generate the plurality of multidimensional feature vectors.

BRIEF DESCRIPTION OF THE DRAWINGS

FIG. 4 is a pseudo-code representation of example instructions for implementing the example methods of FIGS. 3B and 3C.

Similar reference numerals may have been used in different figures to denote similar components.

DESCRIPTION OF EXAMPLE EMBODIMENTS

Some examples of the present disclosure are described in the context of autonomous vehicles. However, the methods and systems disclosed herein may also be suitable for implementation outside of autonomous devices, for example in non-vehicular devices, and non-autonomous devices. For example, any system or device that performs object classification or segmentation on unordered points may benefit from the examples described here. Further, examples of the present disclosure may be implemented in image processing devices including cameras or sensors, such as workstations or other computing devices not related to autonomous machines (e.g., image processing workstations for classifying or analyzing radar data or ultrasound data).

Although examples described herein refer to a motor vehicle as the autonomous vehicle, the teachings of the present disclosure may be implemented in other forms of autonomous or semi-autonomous vehicles including, for example, trams, subways, trucks, buses, watercraft, aircraft, ships, drones (also called unmanned aerial vehicles (UAVs)), warehouse equipment, construction equipment or farm equipment, and may include vehicles that do not carry passengers as well as vehicles that do carry passengers. The methods and systems disclosed herein may also be suitable for implementation in non-vehicular devices, for example autonomous vacuum cleaners and lawn mowers.

Figure 1:
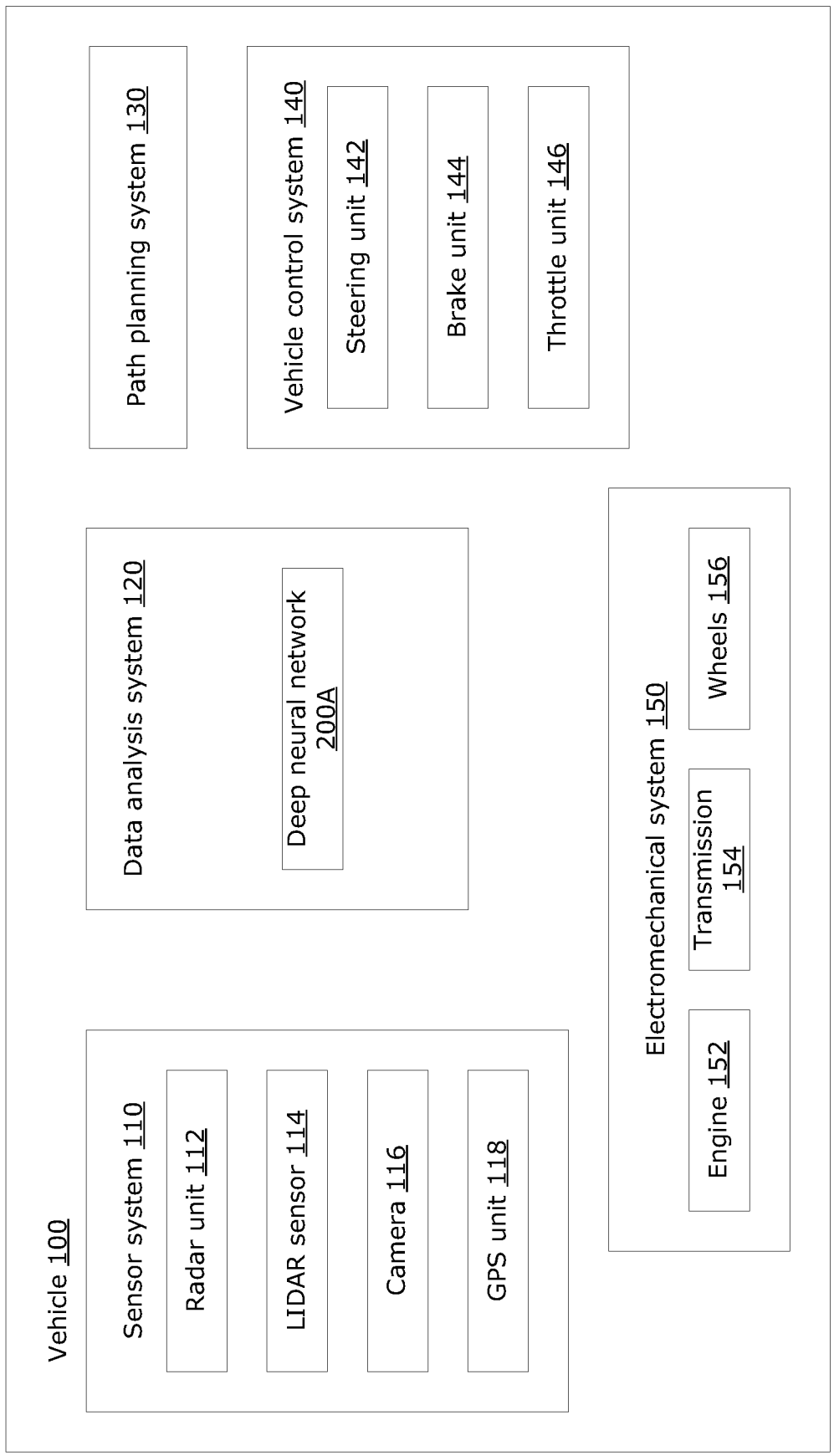
FIG. 1 is a block diagram illustrating some components of an example autonomous vehicle.

FIG. 1 is a block diagram illustrating certain components of an example autonomous vehicle 100. Although described as being autonomous, the vehicle 100 may be operable in a fully-autonomous, semi-autonomous or fully user-controlled mode. In the present disclosure, the vehicle 100 is described in the embodiment of a car, however the present disclosure may be implemented in other vehicular or non-vehicular machines, as discussed above.

The vehicle 100 includes a sensor system 110, a data analysis system 120, a path planning system 130, a vehicle control system 140 and an electromechanical system 150, for example. Other systems and components may be included in the vehicle 100 as appropriate. Various systems and components of the vehicle may communicate with each other, for example through wired or wireless communication. For example, the sensor system 110 may communicate with the data analysis system 120, path planning system 130 and the vehicle control system 140; the data analysis system 120 may communicate with the path planning system 130 and the vehicle control system 140; the path planning system 130 may communicate with the vehicle control system 140; and the vehicle control system 140 may communicate with the electromechanical system 150.

The sensor system 110 includes various sensing units for collecting information about the internal and/or external environment of the vehicle 100. In the example shown, the sensor system 110 includes a radar 112, a LIDAR sensor 114, a camera 116 and a global positioning system (GPS) 118 for collecting information about the external environment of the vehicle. The sensor system 110 may include other sensing units, such as a temperature sensor, precipitation sensor or microphone, among other possibilities.

The camera 116 may be a RGB-D camera which captures static image and/or a video comprising a set of images, for example and generate image data representative of the captured static image and/or the images of the video. In some examples, each image may include per-pixel depth information. The image data captured by the camera 116 may be 3D image data, which may be encoded in the form of a 3D point cloud and provided as 3D data.

The LIDAR sensor 114 may capture information in a wide view (e.g., 360° view) about the vehicle 100. The LIDAR sensor 114 may also capture 3D information about the external environment, and the captured information may be encoded in the form of a set of data points in the 3D space (e.g., a 3D point cloud) and provided as 3D data, where each data point in the 3D data represents 3D coordinates (e.g., x, y and z values in meters) of a sensed object in the 3D space (e.g. the point of origin from which light is reflected from the object). In some examples, in addition to 3D coordinates, each data point in the 3D data may also contain other information, such as intensity of reflected light or time of detection.

Regardless of whether the 3D data is output by the camera 116 or by the LIDAR sensor 114 in the form of a point cloud, the data points in the point cloud may be irregularly spaced, for example depending on the external environment.

Using the various sensing units 112, 114, 116, 118, the sensor system 110 may collect information about the local external environment of the vehicle 100 (e.g., any immediately surrounding obstacles) as well as information from a wider vicinity (e.g., the radar unit 112 and LIDAR sensor 114 may collect information from an area of up to 100m radius or more around the vehicle 100). The sensor system 110 may also collect information about the position and orientation of the vehicle 100 relative to a frame of reference (e.g., using the GPS unit 118). The sensor system 110 may further collect information about the vehicle 100 itself. In such a case, the vehicle 100 may itself be considered part of the sensed environment. For example, the sensor system 110 may collect information from sensing units (e.g., accelerometers, speedometer, odometer and/or inertial measurement unit), which may or may not be part of the sensor system 110, to determine the state of the vehicle 100, such as linear speed, angular speed, acceleration and tire grip of the vehicle 100.

The sensor system 110 communicates with the data analysis system 120 to provide sensor data, including 3D data to the data analysis system 120 which is configured to learn to detect, identify, and classify objects in the external environment using the sensor data, for example to detect, identify, and classify a pedestrian or another car. The data analysis system 120 may be any suitable learning-based machine perception system that implements machine learning algorithms to learn to detect, identify, classify objects in the external environment, for example to detect and identify a pedestrian or another car. The data analysis system 120 in this example includes a deep neural network for object classification 200A (FIG. 2) which will be described with greater detail below. The data analysis system 120 may be implemented using software, which may include any number of independent or interconnected modules or control blocks, for example to implement any suitable machine learning algorithms to perform feature extraction using 3D data received from the LIDAR sensor 114 and/or the camera 116, and object classification using the extracted features. The software of the data analysis system 120 may be executed using a one or more processing units of a vehicle controller (not shown) of the vehicle 100 as described below. The output of the data analysis system 120 may include, for example data identifying objects, including for each object, an object class or label.

Sensor data from the sensor system 110 and the output of the data analysis system 120 may be provided to the path planning system 130. The path planning system 130 carries out path planning for the vehicle 100. For example, the path planning system 130 may plan a path for the vehicle 100 to travel from a starting point to a target destination, using information from the GPS unit 118. The path planning system 130 may be implemented as one or more software modules or control blocks carried out by one or more processing units in the vehicle 100. In some examples, the path planning system 130 may perform path planning at different levels of detail, for example on a mission planning level, on a behavior planning level, and on a motion planning level. The output from the path planning system 130 may include data defining one or more planned paths for the vehicle 100 to travel. The path planning carried out by the path planning system 130 is performed in real-time or near real-time, to enable the vehicle 100 to be responsive to real-time changes in the sensed environment. Output from the path planning system 130 may be provided to the vehicle control system 140.

The vehicle control system 140 serves to control operation of the vehicle 100. The vehicle control system 140 may be used to provide full, partial or assistive control of the vehicle 100. The vehicle control system 140 may serve to fully or partially control operation of the electromechanical system 150, when the vehicle 100 is operating autonomously or semi-autonomously, based on the planned path from the path planning system 130. Data received from the sensor system 110 and/or the data analysis system 120 may also be used by the vehicle control system 140. In this example, the vehicle control unit 140 includes a steering unit 142, a brake unit 144 and a throttle unit 146. Each of these units 142, 144, 146 may be implemented as separate or integrated software modules or control blocks within the vehicle control system 140. The units 142, 144, 146 generate control signals to control the steering, braking and throttle, respectively, of the vehicle 100. The vehicle control system 140 may include additional components to control other aspects of the vehicle 100 including, for example, control of turn signals and brake lights.

The electromechanical system 150 receives control signals from the vehicle control system 140 to operate the mechanical components of the vehicle 100. The electromechanical system 150 effects physical operation of the vehicle 100. In the example shown, the electromechanical system 150 includes an engine 152, a transmission 154 and wheels 156. The engine 152 may be a gasoline-powered engine, an electricity-powered engine, or a gasoline/electricity hybrid engine, for example. Other components may be included in the electromechanical system 150, including, for example, turn signals, brake lights, fans and windows.

The vehicle 100 may include other components that are not shown, including, for example, a user interface system and a wireless communication system (e.g., including an antenna). These other components may also provide input to and/or receive output from the above-described systems. The vehicle 100 may communicate with an external system, for example an external map database. The vehicle 100 may also communicate with a network, for example a vehicle network that enables communication among autonomous, semi-autonomous or non-autonomous vehicles.

The sensor system 110, data analysis system 120, path planning system 130 and the vehicle control system 140 may be individually or in combination be realized, at least in part, in one or more processing units of a vehicle controller (not shown) of the vehicle 100. The one or more processing units may be central processing units, graphic processing units, tensor processing units, and any combination thereof. For example, the vehicle controller (not shown) of the vehicle 100 may include a processing unit having one or more physical processors (e.g., a microprocessor, microcontroller, digital signal processor, field programmable gate array, or application specific integrated circuit) coupled to one or more tangible memories (not shown). A processing unit may also be referred to as a computing unit or a controller. The memory(ies) may store instructions, data and/or software modules for execution by the processing unit(s) to carry out the functions of the systems described herein. The memory(ies) may store other software instructions and data for implementing other operations of the vehicle 100. Each memory may include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As discussed above, 3D data output by the RGB-D camera 116 or the LIDAR sensor 114 in the form of a point cloud is irregular and unordered. That is, the set of data points forming the point cloud are irregularly spaced and may be indexed in an arbitrary order. Various learning-based machine perception systems that implement conventional machine learning algorithms have been developed and used for classifying objects in unordered point clouds. However, when there is a large number of unordered data points in the unordered point cloud, this may pose challenges on object classification, such as increased computation cost, and possible inaccuracy of classification in the learning-based machine perception systems. Moreover, point cloud data (e.g., 3D data) may include redundant data, which may cause processing of the 3D data for object classification to be slow and may introduce significant delays which may be undesirable in various scenarios, such as autonomous driving.

A deep neural network, as disclosed herein, may help to improve object classification accuracy and reduce computational cost, and may address at least some drawbacks of the above-discussed conventional deep machine learning algorithms. The disclosed deep neural network may be used in various applications, including autonomous driving, robotics, or drone navigation in artificial intelligence (AI) systems.

Figure 2A:
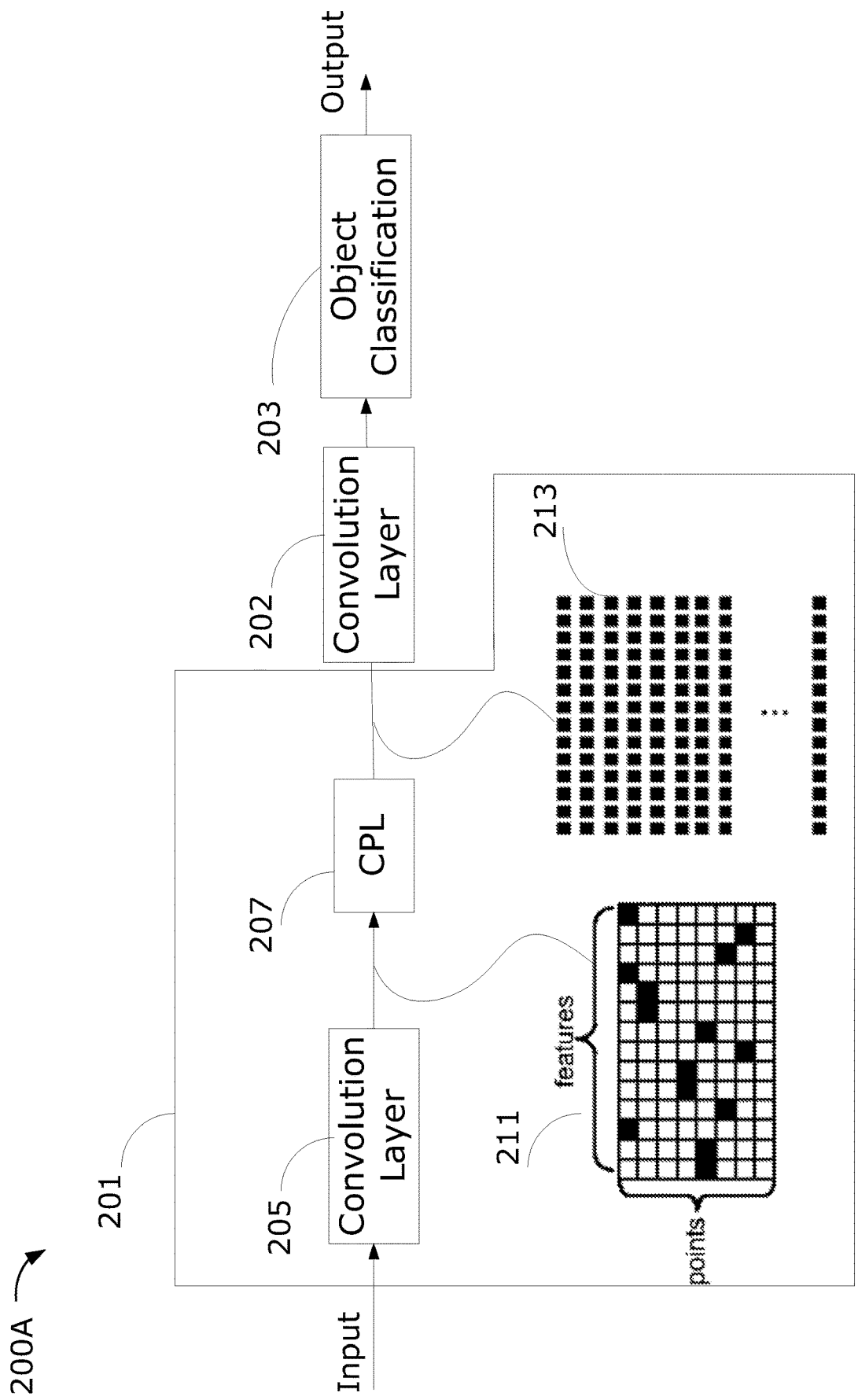
FIG. 2A is a schematic diagram of an example deep neural network in accordance with one example embodiment.

FIG. 2A is a schematic diagram of an example deep neural network 200A, which may be used in the data analysis system 120 for object classification, in accordance with an example embodiment. The deep neural network 200A has a hierarchical structure, which includes at least feature extraction subsystem 201, a convolution layer 202, and an object classification subsystem 203. For ease of illustration, only one feature exaction subsystem 201, and one object classification subsystem 203 are discussed in the example of FIG. 2A. The feature extraction subsystem includes a convolution layer 205 for performing a convolution operation, such as edge convolution, and a critical point layer (CPL) 207. The feature extraction subsystem 201 may be implemented using one or more suitable neural networks (e.g., a CNN) to produce feature vectors for a respective unordered data point. Another deep neural network 200B, having different hierarchical structure with a plurality of feature extraction subsystems 201, and an object classification subsystem 203, will be described further below with reference to FIG. 2B.

As shown in FIG. 2A, 3D data in the form of a point cloud is received as input to the feature extraction subsystem 201 of the deep neural network 200A. The point cloud includes a plurality of unordered data points. With respect to one point cloud, a plurality of labeled critical data points are output from the deep neural network 200A. The plurality of labeled critical data points are all assigned one object class label. The other unordered data points which are not selected as critical data points may be discarded to save computational cost. For example, in the context of an autonomous vehicle, some critical points from a point cloud may be labeled as representing a pedestrian. For ease of illustration, processing the plurality of unordered data points of one point cloud is discussed herein and below. In some examples, the plurality of unordered data points may be sensed 3D data from the sensor system 110 (e.g., from the LIDAR sensor 114 or camera 116) shown in FIG. 1. Each unordered data point may be represented by x, y and z values of a 3D coordinate. That is, each unordered data point may be represented as a 3D vector including respective values in x, y and z features. The plurality of unordered data points (which may be in the form of 3D vectors) is provided to the convolution layer 205 to generate a plurality of multidimensional feature vectors arranged in a point-feature matrix 211. Each row of the point-feature matrix 211 corresponds to a respective feature vector, and each feature vector represents a respective unordered data point from the point cloud. A feature vector includes feature-correlated values, representing a plurality of features, which are output by the convolution layer 205. Each feature-correlated value contained in the feature vector may be considered a dimension of the feature vector, hence the feature vector may be considered a multidimensional feature vector. Each column of the point-feature matrix 211 corresponds to a respective one of the plurality of features. Thus, a multidimensional feature vector represents a given unordered point, and the multidimensional feature vector includes a plurality of feature-correlated values, where each feature-correlated value represents the extent to which the given unordered point correlates to the respective feature. The plurality of feature-correlated values and the correlation extent will be discussed further below.

The convolution layer 205 may be referred to as a "filtering stage", because the convolution layer 205 may use a filter or a kernel to generate the feature vectors. The number of features that are identified by the convolution layer 205 may be associated with a filtering factor. In this example, the number of features for each multidimensional feature vector is larger than 3. In some implementations, the plurality of features associated with a respective multidimensional feature vector may be different from the original 3 features (e.g., the x, y and z coordinate values) associated with the original 3D vector representing an unordered data point. In addition, the convolution layer 205 may help to increase the number of features correlated to a respective unordered data point. In some examples, different data points in the point cloud may be originally associated with different numbers of features (e.g., having fewer or greater than three features). Regardless of the number of features associated with different unordered data points inputted to the convolution layer 205, feature vectors outputted from the convolution layer 205 may have same number of features. For example, the convolution layer 205 may be designed to output feature vectors representing a predefined set of features (e.g., predefined according to desired object classes). The convolution layer 205 may thus output feature vectors representing the same features, to represent different unordered points. This may enable implementation of subsequent object classification steps to be performed more readily.

For ease of illustration, the example discussed herein refers to the point-feature matrix 211 being outputted from the convolution layer 205, to a CPL for down-sampling data points from the point cloud by generating a reduced-max matrix 213. This is only illustrative and is not intended to be limiting. In other examples, the point-feature matrix 211 may have different configurations. For example, the point-feature matrix 211 may represent a different number of points than the example shown in FIG. 2A, based on the number of unordered points received as input. The point-feature matrix 211 may also represent a different number of features than the example shown in FIG. 2A, in accordance with the filtering factor of the convolution layer 205. In the example shown in FIG. 2A, the point-feature matrix 211 includes 8 multidimensional feature vectors (having row indices 0-7), and each multidimensional feature vector has 14 features. Thus, the point-feature matrix 211 is a 8×14 matrix having 8 rows corresponding to 8 unordered points of a point cloud, and 14 columns corresponding to 14 features.

The CPL 207 is provided the point-feature matrix 209 output by the convolution layer 205. The CPL 207 uses the point-feature matrix 211 to generate a reduced-max matrix 213. Each row of the reduced-max matrix 213 represents a respective feature-relevant vector. A feature-relevant vector is a multidimensional feature vector that is selected from the point-feature matrix 211, as discussed further below. In this example, each feature-relevant vector represents a critical data point in the point cloud. In the present disclosure the term "critical" refers to a data point that is selected to be represented in the reduced-max matrix 213 because of its feature-relevance. A critical data point has more importance for the purpose of object classification than other data points that were not selected to be represented in the reduced-max matrix 213. For ease of illustration and understanding, the reduced-max matrix 213 output from the CPL 207 is discussed herein and also used as an example to demonstrate configuration of each critical data point in the further example below. This is only illustrative and is not intended to be limiting. In other examples, the dimensions of the reduced-max matrix 213 may be different, for example based on different methods to select critical data points. The identification and selection of the critical data points from the point-feature matrix 211 to produce the reduced-max matrix 213 will be discussed in greater detail below.

Each column of the reduced-max matrix 213 corresponds to a respective feature. It should be noted that the number of columns of the point-feature matrix 211 and the number of columns of the reduced-max matrix 213 are equal, which means that a multidimensional feature vector and a feature-relevant vector represent the same features. The number of rows of the reduced-max matrix 213 is less than the number of rows of the point-feature matrix 211. The CPL 207 generates the reduced-max matrix 213 by, for each feature, selecting a respective multidimensional feature vector in the point-feature matrix 211 having a maximum feature-correlated value associated with that feature. In particular, for each feature (i.e., each column of the point-feature matrix 211), the CPL 207 identifies the multidimensional feature vector having the highest value contained in that column, and selects that identified multidimensional feature vector to be a feature-relevant vector to be included in the reduced-max matrix 211.

Thus, the reduced-max matrix 213 only includes multi-dimensional feature vectors from the point-feature matrix 211 that have at least one maximum feature-correlated value associated with different features. Such a method for selecting critical data points, as represented by feature-relevant vectors, using at least one CPL 207, may help to improve classification accuracy by the object classification subsystem 203 of the deep neural network 200A. This may also help to reduce complexity of computation as the number of critical points is significantly less than the total number of captured points in the point cloud.

The convolution layer 202 receives the reduced-max matrix 213 and performs a convolution operation of the reduced-max matrix 213. The output of the convolution layer 202 is a set of critical data points. The set of critical data points may be represented in the form of feature vectors arranged in a reduced-max matrix with further features. The feature vectors are then provided to the object classification subsystem 203 which performs object classification to assign the critical points in the point cloud an object class label. The output of the object classification subsystem 203 includes a plurality of labeled critical data points that are associated with and correspond to an object. The object classification subsystem 203 can be implemented using any type of neural network, such as a support vector machine (SVM).

As noted above, the convolution layer 205 is configured to increase features for a respective unordered data point in the point cloud and the CPL 207 is configured to select critical data points. In some implementations, the convolution layer 205 with a filtering factor i may increase the number of features of a respective unordered point to i, and the CPL 207 with a down-sampling factor j may reduce the number of critical data points to one $j^{th}$ of the number of unordered data points.

In some alternative examples, feature extraction subsystem 201, including the convolution layer 205 and the CPL 207, may be applied as many times as desired to constitute a deep neural network having a different respective hierarchical structure. The deep neural network may be designed to achieve a desired number of critical data points and a desired number of features, for example in order to attain a desired accuracy in object classification.

Figure 2B:
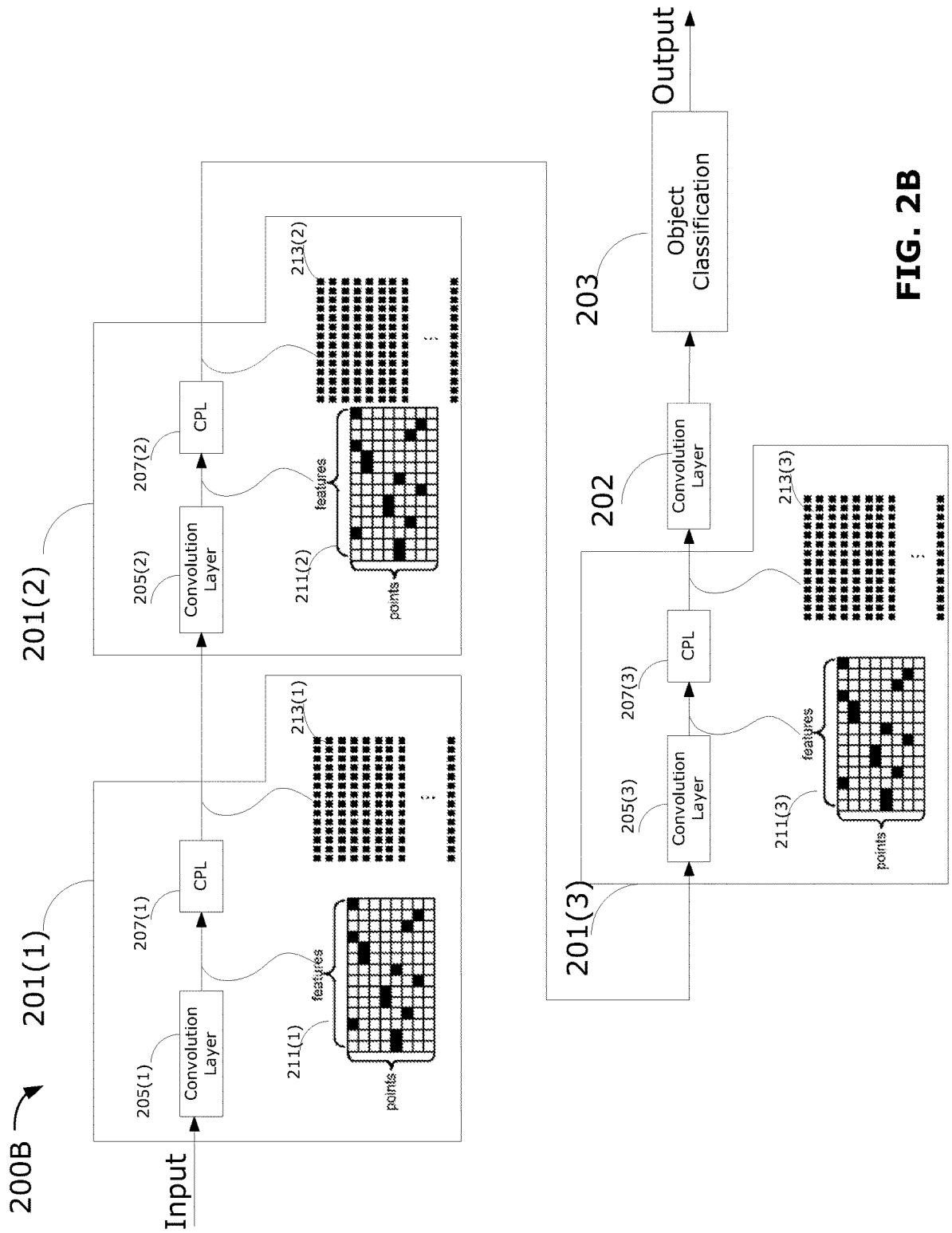
FIG. 2B is block diagram of another example deep neural network in accordance with a further example embodiment.

FIG. 2B shows an example deep neural network 200B having a plurality of feature extraction subsystems 201(1) to 201(3) (generally referred to as feature traction subsystem 201) in accordance with a further example embodiment. The deep neural network 200B may be designed with a plurality of feature extraction subsystems 201 in order to output a desired number of critical data points each with a desired number of features. Each feature extraction subsystem 201 can be configured to output a predefined number of critical data points and a predefined number of features for each critical point.

For example, N unordered data points of a point cloud are received as input by the first feature extraction subsystem 201(1). In some examples, an arbitrary number of features are associated with each one of the N unordered data points. The first feature extraction subsystem 201(1) includes a first convolution layer 205(1) with a first filtering factor $F_{k1}$ and a first CPL 207(1) with a first down-sampling factor k1. Thus, the output of the first feature extraction subsystem 211(1) is N/k1 critical data points each having $F_{k1}$ features. The number of critical data points may be further reduced and the number of features may be further increased by one or more subsequent feature extraction subsystems 201. The number of the extraction subsystems 201 used to process the unordered data points is determined based on the desired number of output points of the deep neural network 200B, and the desired number of featured associated with the output of the deep neural network 200B. In the example shown in FIG. 2B, the deep neural network 200B includes three feature extraction subsystems 201(1), 201(2), and 201(3) and a final layer (e.g., convolution layer 202). Generally, each feature extraction subsystem 201(i) includes a convolution layer 205(i) with a filtering factor $F_{ki}$ and a CPL 207(i) with a down-sampling factor ki, where i is an integer. In this example, the three feature extraction subsystems 201 are used to output N/(k1×K2×k3) critical data points, each critical data point having $F_{k3}$ features as a reduced-max matrix 213(i). The convolution layer 202, having a filtering factor $F_{k4}$, acts as a final convolutional operation to be applied, thus the output of the convolution layer 202 is N/(k1×K2×k3) critical data points with each data point having $F_{k4}$ features. The output of the convolution layer 202 is reduced-max matrix 213(3) with further features, which is provided to the object classification subsystem 203 to perform object classification on the critical data points, as discussed above.

It is noted that the number of convolution layers may be different than the number of the CPLs and the convolution layers may be used separately with the CPLs, in order to facilitate an output of a deep neural network to achieve a desired number of features (by using different convolution layers), and attain a desired number of critical data points (by using different of CPLs). The desired number of features and the desired number of critical points in the output may be predefined. The example of FIG. 2B is only used for illustration and is not intended to be limiting. In other examples, different configurations including different numbers of convolution layers 205 and CPLs 207 may be applied in different configurations of the deep neural network.

Figure 3A:
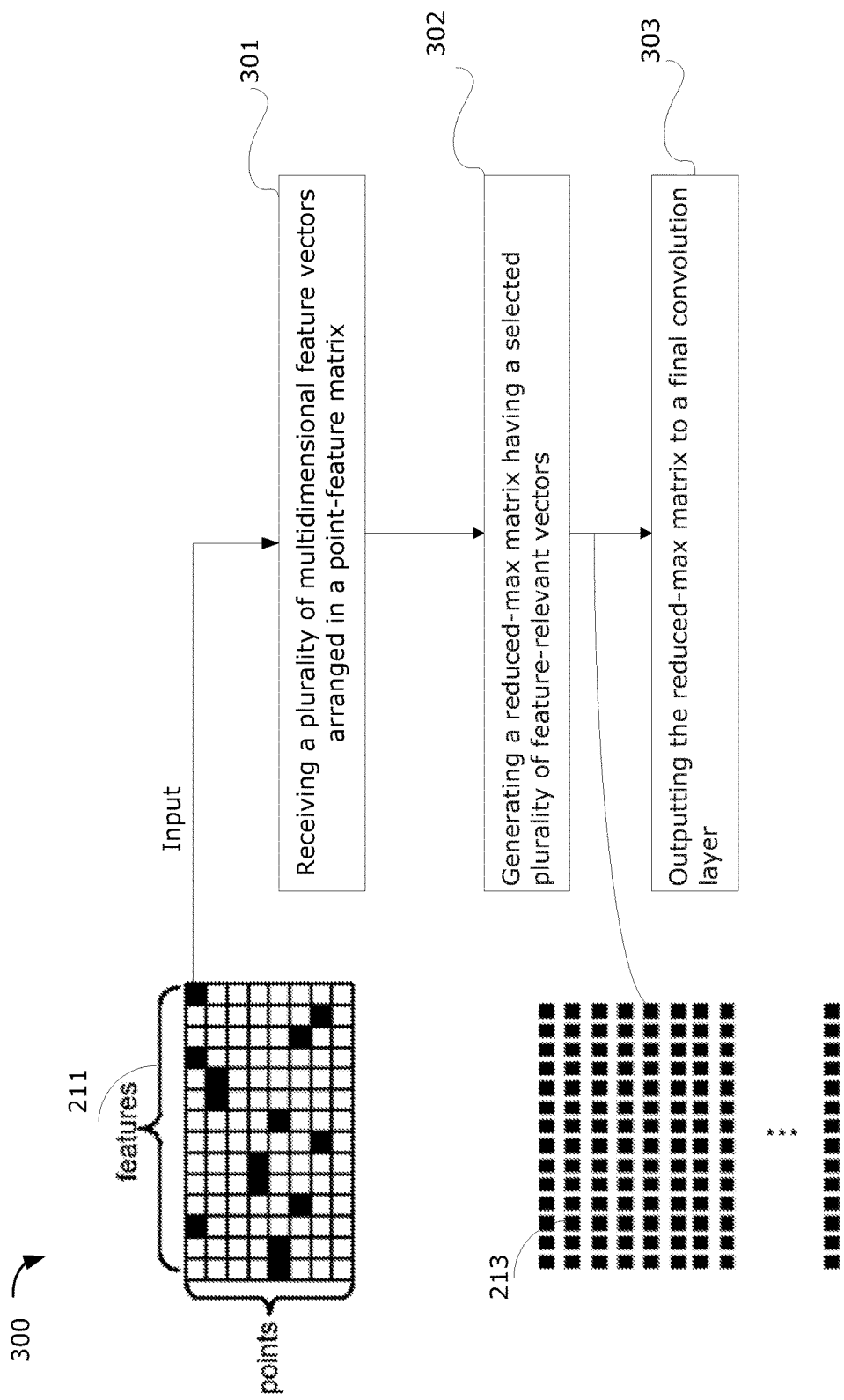
FIG. 3A is a flowchart illustrating an example method that may be implemented by at least one CPL of FIG. 2A.

FIG. 3A shows an example method 300 for applying the feature extraction subsystem 201 to a plurality of multidimensional feature vectors to output a plurality of critical data points. The method 300 may be performed by the feature extraction subsystem 201 of the deep neural network 200A, 200B.

At action 301, a plurality of multidimensional feature vectors arranged in a point-feature matrix 211 are received. Each row of the point-feature matrix corresponds to a respective one of the multidimensional feature vector, and each column of the point-feature matrix corresponds to a respective feature.

As shown in FIG. 3, the point-feature matrix 211 includes 8 multidimensional feature vectors with 0-7 row indices and each multidimensional feature vector has 14 features. That means each multidimensional feature vector is a 14-dimensional (14D) feature vector. In some examples, the feature extraction subsystem 201 may apply encode unordered data points (e.g., 3D data in the form of a point cloud captured by the LIDAR sensor 114 or RGB-D camera 116) into the 8

14D feature vectors. Thus, each multidimensional feature vector represents a respective unordered data point from the point cloud.

With respect to point-feature matrix 211, for a given feature (i.e., a given column), the correlation extent is used to evaluate which multidimensional feature vector makes greater contribution with respect to this feature and is more important than other multidimensional feature vectors for this feature. The feature-correlated value of a multidimensional feature vector for a given feature may be directly proportional to the correlation extent of the multidimensional feature vector for that given feature. For example, the larger the feature-correlated value of a multidimensional feature vector, the more important the unordered data point corresponding to the respective multidimensional feature vector, for that given feature.

At action 302, a reduced-max matrix 213 having a selected plurality of feature-relevant vectors is generated. Each row of the reduced-max matrix 213 corresponds to a respective feature-relevant vector, and each column of the reduced-max matrix 213 corresponds to a respective feature. For each feature, a respective multidimensional feature vector in the point-feature matrix 211 having a maximum feature-correlated value associated with the respective feature is identified to select the feature relevant vectors.

For example, consider a first column associated with a first feature in the point-feature matrix 211 shown in FIG. 3A. In the first column, a feature-correlated value in row index 4 has a maximum value (marked as a dark entry in the point-feature matrix 211) among all rows of the point-feature matrix 211. That indicates that the point corresponding to the multidimensional feature vector at row index 4 has the most contribution to the first feature. This is only illustrative and is not intended to be limiting. In other examples, the correlation extent may be inversely proportional to the feature-correlated values.

It should be noted that a single multidimensional feature vector may contain more than one maximum feature-correlated value for different features. For example, in FIG. 3A, the multidimensional feature vector at row index 4 contains maximum feature-correlated values for the first column as well as for the second column. It should also be noted that one or more multidimensional feature vectors of the point-feature matrix 211 may contain zero maximum feature-correlated values. For example, the multidimensional feature vector at row index 2 does not contain any maximum feature-correlated values. In the event that two or more multidimensional feature vectors contain equally high maximum feature-correlated values for a given feature, all such multidimensional feature vectors may be selected as feature-relevant vectors for that feature; alternatively, one of the two or more multidimensional feature vectors may be randomly selected as the feature-relevant vector for that feature.

As shown in FIG. 3A, the reduced-max matrix 213 includes a selected plurality of feature-relevant vectors. As described above, each feature-relevant vector represents a respective critical data point. The CPL 207 is applied to output the reduced-max matrix 213 in which the number of critical data points is less the number of multidimensional feature vectors of the point-feature matrix 211, and the number of a respective critical data point's features is identical to the number of features in the respective multidimensional feature vector. The CPL 207 may thus help to reduce the number of data points required to be processed by subsequent convolution layers of the deep neural network, which may help to save computation cost.

At action 303, the reduced-max matrix 213 is outputted to at least final convolution layer 202. The convolution layer 202 performs a final feature extraction (e.g., applying a final filtering factor as discussed above), which may serve to achieve a constant number of features for all the critical data points, and outputs the reduced-max matrix 213 with further features. In some examples, the deep neural network includes an object classification subsystem 203 as shown in FIG. 2A comprising one or more fully connected layers (not shown). The reduced-max matrix 213 with further features, as outputted from the convolution layer 202, may be provided as input to the object classification subsystem 203. The object classification subsystem 203 performs object classification on the output of the final convolution layer 202 to assign the plurality of critical data points from the point cloud an object class label.

As the reduce-max matrix 213 includes a selected plurality of feature-relevant vectors each having at least one maximum feature-correlated value associated with different respective features, the number of critical points output from the CPL may be reduced significantly, compared to the number of unordered data points captured from sensors. Moreover, critical data points are identified and selected based the significance and contribution of each data point to different respective features. Thus, critical data points may be selected dynamically, as opposed to using conventional static down-sampling to select a fixed subset of data points from the point cloud without consideration of feature-relevance of each data point. Thus, the variable number of critical data points output from the CPL may help to reduce complexity of subsequent object classification dynamically and improve accuracy of the subsequent object classifications greatly.

Figure 3B:
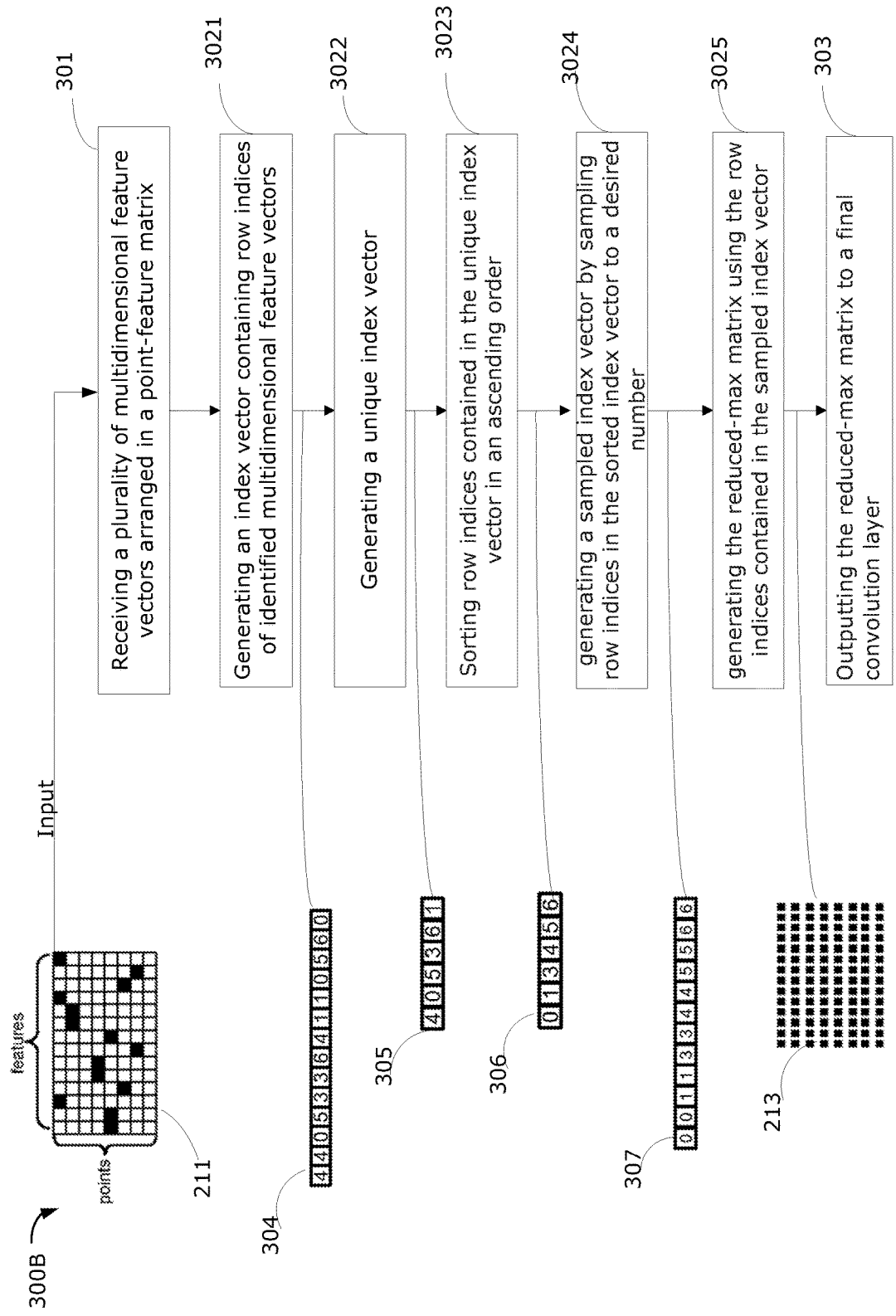
FIG. 3B is a flowchart illustrating an example method for selecting a plurality of critical points from a plurality of unordered point that may be performed by at least one CPL of FIG. 2A.

FIG. 3B illustrates an example method 300B with respect to how to generate a reduced-max matrix by applying a CPL 207 in greater detail. FIG. 4 shows a pseudo-code representation of example instructions of an algorithm 400 for implementing the example method 300B of FIG. 3B. Functions of the algorithm 400 may be applied to implement steps described below. After the point-feature matrix 211 is received at action 301, the method 300B further comprises:

At action 3021, an index vector 304 containing row indices of identified multidimensional feature vectors is generated. An example approach for identifying the row indices in the point-feature matrix 211, for generating the index vector 304 is now discussed. For each respective feature, the feature-correlated values associated with the respective feature are evaluated for all multidimensional feature vectors. The row index corresponding to the multidimensional feature vector having the maximum feature-correlated value is identified for each respective feature. The identified row indices are then stored in the index vector 304. In some examples, identification of the maximum feature-correlated value for a respective feature may be implemented by an argmax( ) function 401 as shown in line 4 of FIG. 4.

For example, in the point-feature matrix 211 shown in FIG. 3B, different feature-correlated values represent different correlation extents for a first feature represented in the first column. The multidimensional feature vector on row index 4 (corresponding to the fifth row in the point-feature matrix 204) is identified to have a maximum feature-correlated value associated with the first feature (marked as a dark entry in the point-feature matrix 204). Therefore, the row index 4 is entered as the first element in the index vector 304. Indices are similarly identified and entered for all other features, to constitute the index vector 304.

At action 3022, a unique index vector is generated. The unique index vector 305 is generated from the index vector 304 by removing repetitions in the index entries. For example, in FIG. 3B, the generated index vector 304 shows row index 4 is entered 3 times—corresponding to the first, second, and eighth features. This is because the multidimensional feature vector at row index 4 has maximum feature-correlated values associated with the first, second, and eighth features. The row index 4 is entered only once in the unique index vector 305. Thus, in the example shown in FIG. 3B, the unique index vector 305 includes a plurality of unique row indices (e.g., 4, 0, 5, 3, 6, 1 . . . ) each corresponding to a different respective multidimensional feature vector. In some examples, generating the unique index vector 305 may be implemented by an unique( ) function 402 presented in line 7 of FIG. 4.

At action 3023, row indices contained in the unique index vector 305 are sorted in an ascending order (or descending order) and a sorted index vector 306 is generated. As shown in FIG. 3B, the row indices in the unique index vector 305 and in the sorted vector 306 are same, except in a sorted order. Sorting the row indices in the sorted index vector 306 may be beneficial for performing a subsequent sampling action, such as for performing deterministic sampling. In some implementations, the action 3023 may be performed by using a sort ( ) function 403 shown in line 6 of FIG. 4.

At action 3024, a sampled index vector 307 is generated by sampling row indices contained in the sorted index vector 306 to obtain a desired number of entries. This may be useful for batch processing, to ensure that the number of critical data points that are processed in subsequent layers is kept constant. The sampling can be up-sampling to a desired number or down-sampling to a desired number. The desired number may be determined based on a parameter criterion of the algorithm used for the batch processing, for example. The sampling may be performed using deterministic sampling or stochastic sampling. The deterministic sampling may include a nearest neighbor resizing sampling. The stochastic sampling may include random uniform sampling by using a random integer generator. In this example, up-sampling is used to process the sorted index vector 306 and generate the sampled index vector 307 having the desired number (e.g., 12) of row indices. The up-sampling may be implemented by using a rand ( ) function 404 as shown in line 8 of FIG. 4. The result of the sampling at action 3024 is that the number of critical data points outputted is the same, for different point clouds that might have different numbers of data points.

At action 3025, the reduced-max matrix 213 is generated using the row indices contained in the sampled index vector 307. In this example, 12 row indices in the sampled index vector 307 are used to gather the corresponding rows from the point-feature matrix. The gathered rows are the feature-relevant vectors contained in the reduced-max matrix 213. It should be noted that because the sampled index vector 307 may contain repeated row indices (e.g., due to up-sampling performed at action 3024), the feature-relevant vectors contained in the reduced-max matrix 213 may contain repetitions.

Then at action 303, the reduced-max matrix 213 is output to the final convolution layer 202 of the deep neural network 200A, 200B, for performing a final feature extraction. Output from the final convolution layer 202 can then be provided to an object classification subsystem 203 for performing object classification and labeling.

Another example method 300C for outputting a reduced-max matrix 213 is now illustrated in greater detail with reference to FIG. 3C. The example method 300C of FIG. 3C may be implemented using the pseudo code shown in FIG. 4, with removal of the function unique( ) 402. This example is similar to the example of FIG. 3B, however the action 3022 is skipped to take into account weighting of the multidimensional feature vectors. In this example, the CPL 207 may be referred to as a weighted critical point layer (WCPL) to implement the method 300C.

Figure 3C:
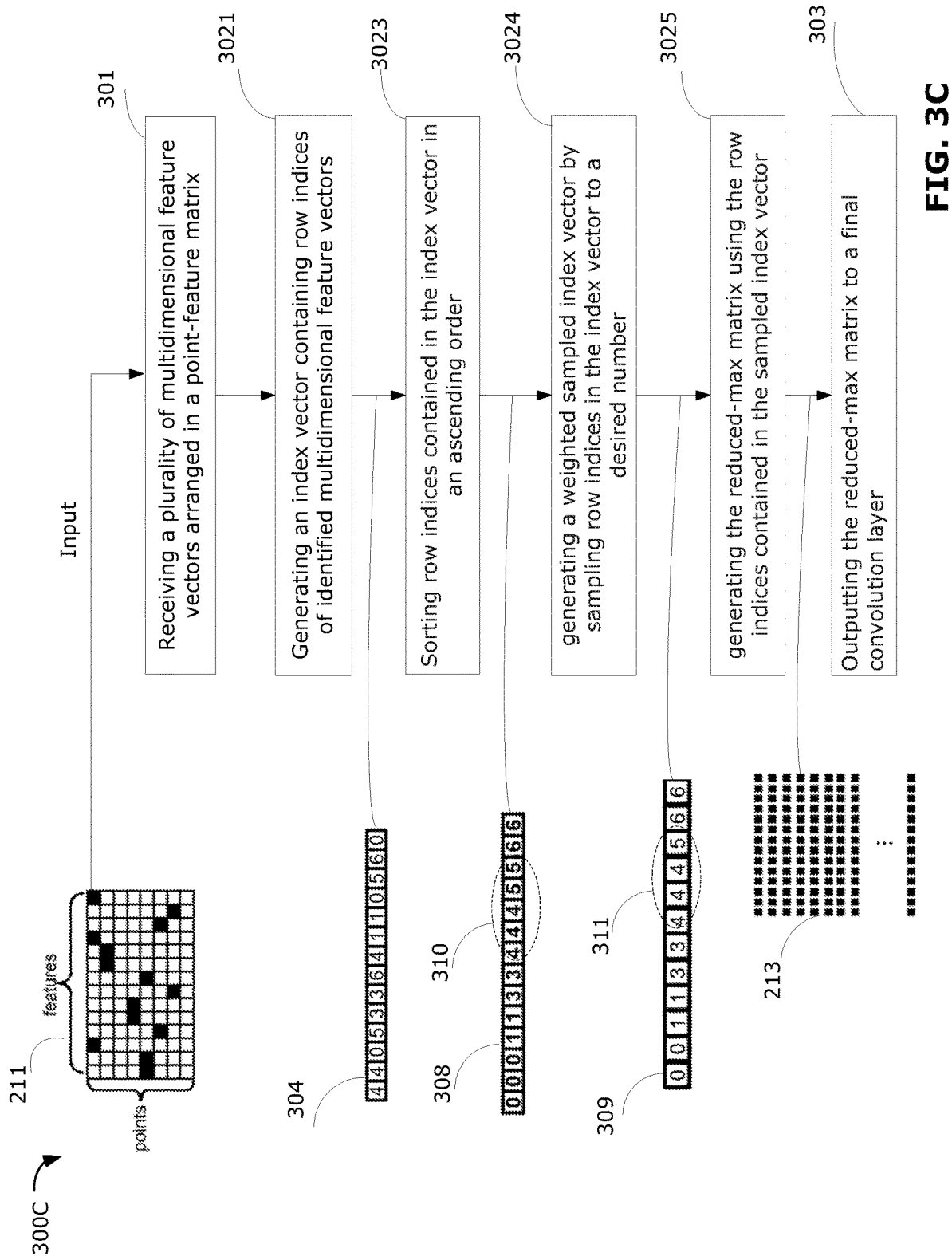
FIG. 3C is a flowchart illustrating an alternative example method for selecting a plurality of critical points from a plurality of unordered point that may be performed by at least one CPL of FIG. 2A.

As shown in FIG. 3C, the row indices identified in the index vector 304 are sorted and sampled by performing the actions 3023 and 3024 without generating the unique index vector. A weighted sorted index vector 308 is output by implementing the action 3023 on the index vector 304. The weighted sorted index vector 308 includes all the row indices identified at action 3021, including repetitions. For example, as shown in a dashed circle 310, the repetition number of row index 4 is 3 and the repetition number of row index 5 is 2. This shows the relative feature-relevance of row index 4, compared to row index 5.

The weighted sorted index vector 308 is then provided as input to perform the action 3024. A weighted sampled index vector 309 is output by performing the action 3024. In this example, the sampling performed at action 3024 is down-sampling. As presented in dashed circle 311, the row index 4 is selected 3 times and only one row index 5 is selected to constitute the weighted sampled index vector 309. With reference to the dashed circle 310 of the weighted sorted index vector 308 and the dashed circle 311 of the weighted sampled index vector 309, it is noted that, in the weighted sorted index vector 308, the repetition number of a first row index (e.g., 4) is higher than the repetition number of a second row index (e.g., 5). Thus, when performing the sampling at action 3024, the first row index repeated with higher frequency is more likely to be selected in the sampling action 3024 than the second row index repeated with lower frequency. The weighted sampled index vector 309 is thus more likely to contain a greater number of entries corresponding to the row index having greater weight (and greater feature-relevance).

By comparing the sampled index vector 307 of FIG. 3B and the weighted sampled index vector 309 of FIG. 3C, it can be seen that the weighted sampled index vector 309 includes row index 4 three times and row index 5 only once, whereas the sampled index vector 307 includes row index 4 two times and row index 5 also appears two times. Accordingly, it can be appreciated that a row index corresponding to a first multidimensional feature vector is likely to be repeated more in the weighted sorted index vector 308 if the first vector has more maximum feature-correlated values associated with different features, when a WCPL is applied, as disclosed in this example. By taking contribution or weighting of a respective multidimensional feature vector into consideration, those multidimensional feature vectors having more feature-relevant contributions or larger weight may be selected in the sampling process with greater probabilities. This may help to ensure critical points having more importance to be selected for further subsequent processing with greater accuracy.

Regarding the method 300B of FIG. 3B and the method 300C presented in FIG. 3C, it is noted that the actions 3022, 3023, 3024 may each be optional, and each optional step 3022, 3023, 3024 may be performed or omitted independently of each other action. For example, one or more of the actions 3022, 3023, 3024 may be omitted based on desired generation requirements of the critical data points and the reduced-max matrix 213.

In some examples, the action 3022 may be skipped. That is, the corresponding function unique( ) 402 may be removed from the algorithm 400. The result is that the row indices are weighted to represent the relative importance of the multidimensional feature vectors. This, for example, has been discussed with reference to FIG. 3C above.

In some examples, the action 3023 may be omitted. For example, if the sampling of the action 3024 is a stochastic sampling, the action 3023 of sorting may be omitted. If the sampling of the action 3024 is a deterministic sampling, the action 3023 may be performed to enable output of the CPL to be more accurate. If the action 3023 is omitted, the function sort( ) 402 may be removed from the algorithm 400 accordingly. When action 3024 is omitted, the row indices may be remain in the original entry order of the index vector 304. As a result, the order of feature-relevant vectors arranged the reduced-max matrix 213 may correspond to the original entry order of the indices in the index vector 304.

In some examples, if the desired number of critical data points has not been predefined or if it is not necessary to ensure the same number of critical data points is outputted for different point clouds, the action 3024 may be omitted. Thus, the function rand( ) 404 shown in FIG. 4 may be removed accordingly. Thus, the number of critical data points in the reduced-max matrix 213 may equate to the number of identified multidimensional feature vectors in the action 3021.

In some applications, the optional actions 3022, 3023, and 3024 may be performed collectively to generate the reduced-max matrix 213, as discussed in the example method 300B illustrated of FIG. 3B. In some other applications, the optional actions 3022, 3023, and 3024 may be performed selectively to generate different reduce-max matrices 213. In some other implementations, any combination of performing or omitting the optional actions 3022, 3023, and 3024 may be used to generate different reduce-max matrices 213. Thus, the generated reduced-max matrix 213 may reflect functional features of the respective functions 402-404, which correspond to the optional actions 3022-3024 respectively. When any of the alternative actions 3022-3024 is omitted, the reduced-max matrix 213 may be generated without the functional features corresponding to that step.

For example, if only the action 3022 is performed and the actions 3023 and 3024 are omitted, the generated reduced-max matrix 213 will include a plurality of feature-relevant vectors which are unique. That is, critical data points corresponding to the generated reduce-max matrix 213 may have no repetitions.

If only the action 3023 is performed and the actions 3022 and 3024 are omitted, the feature-relevant vectors in the reduced-max matrix 213 will be arranged according to the sorted index order.

If only the action 3024 is performed and the actions 3022 and 3023 are omitted, the number of feature-relevant vectors in the reduce-max matrix 213 will equal a desired number.

In some other implementations, other combinations of the optional actions 3022, 3023, 3024 may be used, as would be appreciated by one skilled in the art. Further, in some examples, the optional actions 3022, 3023, 3024 may be performed in any suitable order. By identifying those vectors having maximum correlation with certain features (e.g., using a CPL 207), a plurality of feature-relevant vectors corresponding to critical data points are outputted in the form of a reduced-max matrix 213. This reduces the number of data points to be processed in subsequent convolution layers of the deep neural network. This may help to reduce computation cost for subsequent classification operations performed by the object classification subsystem 203, and may help to improve the subsequent classification operations.

Figure 5:
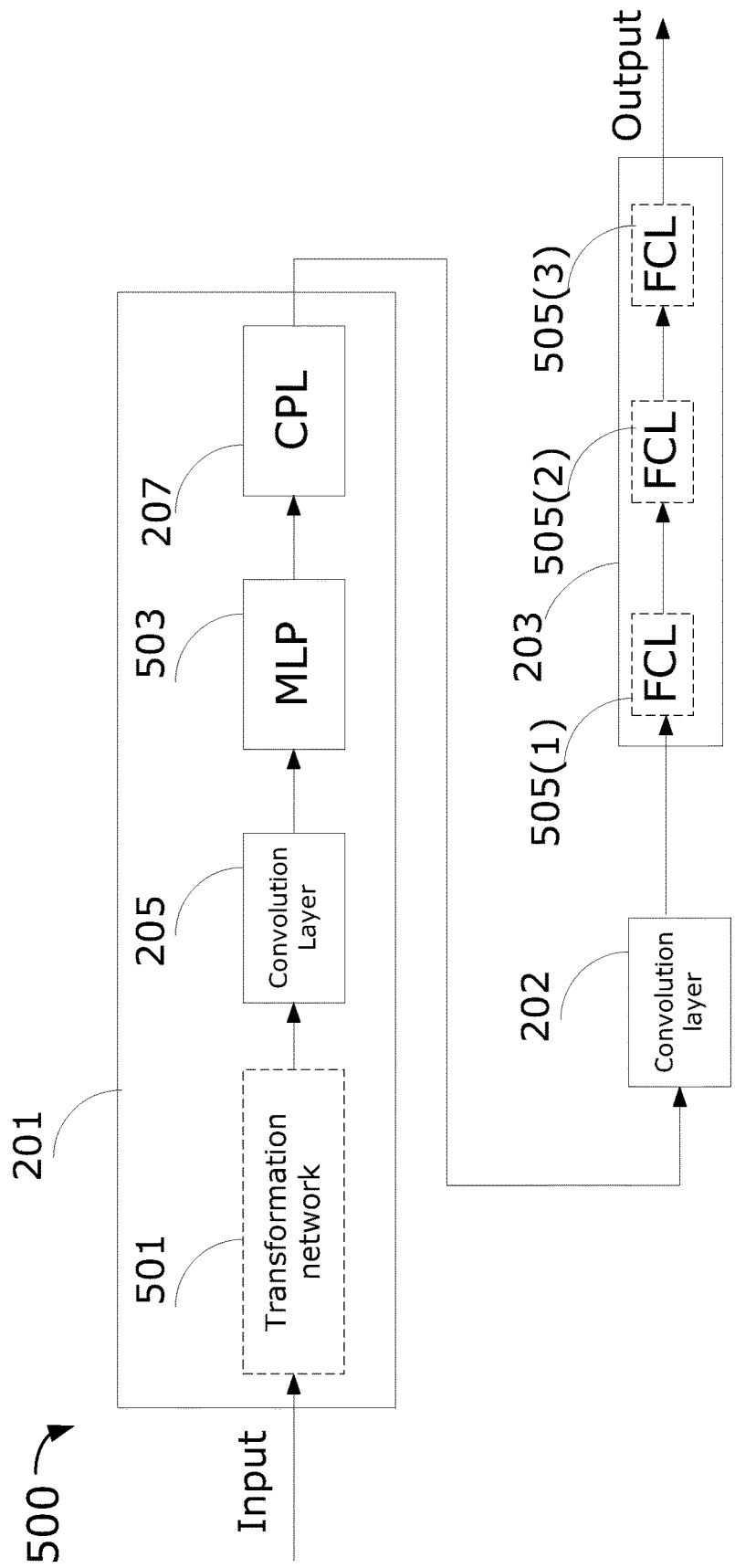
FIG. 5 is a schematic diagram illustrating another example deep neural network in accordance with a further example embodiment.

FIG. 5 illustrates an example deep neural network 500 in which a CPL (or WCPL) is applied as discussed above. The CPL may include a CPL applied in the example shown in FIG. 3B or a WCPL applied in the example shown in FIG. 3C. For simplicity, FIG. 5 shows a CPL. The deep neural network 500 includes feature extraction subsystem 201 comprising a transformation layer 501, a convolution layer 205, a multilayer perceptron (MLP) layer 503, a CPL 207. The deep neural network 500 also includes a final convolution layer 202 and an object classification subsystem 203 comprising three fully connected layers 505(1), 505(2), 505(3). The deep neural network 500 is fed with a plurality of unordered data points of a point cloud. In this example, each unordered data point is represented by a 3D vector and the number of the unordered data points is n. In some other examples, each unordered point may be represented by a different respective vector having an arbitrary number of features. The transformation layer 501 receives the plurality of 3D vectors, performs preliminary spatial transformation and filtering, and generates transformed data. In this example, the preliminary spatial transformation and filtering may be performed to help make the transformed data robust against rotation in different directions. In other examples, transformation may be an optional step and the transformation layer 501 may be omitted from the deep neural network 500. The convolution layer 205 receives the transformed data to perform encoding and filtering, and produces a plurality of multidimensional feature vectors. In this example, each multidimensional feature vector includes 128 features. Thus, the output of the convolution layer 205 is a matrix having dimensions n×128. The MLP layer 503 may further increase the number of features for each vector, for example into 1024 features. A matrix of size n×1024 may thus be produced from the MLP layer 503.

The CPL 207 is then applied on the n×1024 matrix to generate a reduced number of critical data points. For example, the CPL 207 may have a down-sampling factor of 4. Thus, output of the CPL 207 is a matrix of size (n/4)×1024. The number of critical data points is reduced to n/4, and each critical data point includes at least one maximum feature-related value, which may lower computational complexity of subsequent convolution layers without significant loss of accuracy. The CPL 207 disclosed herein can be applied by implementing any of the methods discussed herein, to generate the plurality of critical data points arranged in the reduced-max matrix 213. The reduced-max matrix may contain n/4 rows (corresponding to the number of critical points) and 1024 columns (corresponding to the number of features). As mentioned above, the CPL 207 be a CPL (e.g., in accordance with the method 302A) or a WCPL (e.g., in accordance with the method 302B).

The reduced-max matrix 213 is provided to the final convolution layer 202. The final convolution layer 202 further processes the n/4 critical data points to keep the number of features for a respective critical data point and the number of the critical data points constant. Then the output of the final convolution layer 202 is provided to the object classification subsystem 203 to downsize and label the critical data points. In this example, the object classification subsystem 203 includes 3 FCLs with different downsizing factors. The first FCL 505(1) has a downsizing factor 512, the second 505(2) has a downsizing factor 256, and the third FCL 505 (3) has a downsizing factor 40. The three FCL 505(1) to 505 (3) (being generically referred to as FCL 505)

are predefined for a desired number of classification labels. In this example, the three FCLs 505 are utilized to classify the output from the convolution layer 202 into 40 label classes. This is only an example; in other implementations, the number of FCLs and different respective downsizing factors may be different, for example to form different hierarchical structures of the deep neural network, in accordance with different scenarios, such as for identifying pedestrians and/or other cars in autonomous driving.

The present disclosure provides examples in which a plurality of critical data points may be selected dynamically from a plurality of received unordered points in a point cloud. The disclosed methods may be particularly advantageous in performing classification on unordered data points of a point cloud, using a deep neural network in a complex environment, such as autonomous driving.

The present disclosure further illustrates example hierarchical structures in a deep neural network in which at least one convolution layer encodes and filters a plurality of received unordered points with different respective arbitrary numbers of features and outputs a feature-point matrix, and at least one CPL selects critical data points from the feature-point matrix. Such a hierarchical structure may help to improve efficiency for classifying the critical data point and may help to boost the classification accuracy of the deep neural network.

In some examples, only unique row indices are used for selecting feature-relevant vectors, and the critical data points in output reduced-max matrix are different with respect to each other. Such a method may enable redundant points to be removed, which may further help to downsize the number of critical data points to be processed, resulting in further reducing complexity of the deep neural network.

In some examples, weighting of the row indices may be used. By taking weight or contribution of a different respective feature vectors into consideration, a data point showing greater importance is selected for object classification, which may help to improve classification accuracy.

In some applications, unordered data points of a point cloud may be captured by LIDAR sensors and/or RGB-D cameras situated on a vehicle in an autonomous driving scenario or on a robot in a completing a specific task.

Although the present disclosure describes methods and processes with action in a certain order, one or more actions of the methods and processes may be omitted or altered as appropriate. One or more actions may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method performed by one or more processors, the method comprising:
executing a sequence of two or more feature extraction subsystems, execution of each feature extraction subsystem including:
processing a set of data points using a neural network layer to generate a plurality of multidimensional feature vectors arranged in a point-feature matrix having a plurality of rows and columns, each row of the point-feature matrix corresponding to a respective one of the multidimensional feature vectors, and each column of the point-feature matrix corresponding to a respective feature, each multidimensional feature vector representing a respective data point of the set of data points and including a respective plurality of feature-correlated values, each feature-correlated value representing a correlation extent of the respective feature;
processing the point-feature matrix using a critical point layer (CPL) to generate a reduced-max matrix having a selected plurality of feature-relevant vectors that is fewer in number than the plurality of multidimensional feature vectors in the point-feature matrix by:
identifying, for each column of the point-feature matrix, a multidimensional feature vector from the plurality of multidimensional feature vectors having a highest value; and
selecting, from a plurality of identified multidimensional feature vectors, the selected plurality of feature-relevant vectors to include in the reduced-max matrix;
wherein each row of the reduced-max matrix corresponds to a respective one of the feature-relevant vectors and each column of the reduced-max matrix corresponds to the respective feature of the point-feature matrix; and
outputting the reduced-max matrix;
wherein executing a given one feature extraction subsystem further includes:
providing the reduced-max matrix outputted by the given one feature extraction subsystem as the set of data points inputted to a subsequent feature extraction subsystem in the sequence of two or more feature extraction subsystems.

2. The method of claim 1, wherein the selecting comprises:
generating an index vector containing row indices of the plurality of identified multidimensional feature vectors;
generating a sampled index vector by sampling the row indices in the index vector to a desired number; and generating the reduced-max matrix using the row indices contained in the sampled index vector.

3. The method of claim 2, wherein the sampling is deterministic, the method further comprising:
prior to the sampling, sorting the row indices contained in the index vector in an ascending order.

4. The method of claim 2, wherein the desired number is predefined for performing batch processing for different respective point clouds.

5. The method of claim 2, further comprising:
prior to the sampling, removing any repetitions in the row indices contained in the index vector.

6. The method of claim 1, wherein reduced-max matrix outputted by a last feature extraction subsystem in the sequence of two or more feature extraction subsystems is outputted for processing by a final layer of a neural network by:
providing the reduced-max matrix, outputted by the last feature extraction subsystem, as input to the final layer, the final layer being executed by the one or more processors to extract a desired number of represented features from each feature-relevant vector; and
providing the output of the final layer to an object classification subsystem of the neural network to classify the selected plurality of feature-relevant vectors.

7. The method of claim 1, further comprising:
receiving a plurality of unordered data points of a point cloud;
generating a plurality of transformed data by applying preliminary spatial transformation and filtering to the received unordered data points; and
providing the plurality of transformed data as the set of data points inputted to a first feature extraction subsystem in the sequence of two or more feature extraction subsystems.

8. The method of claim 7, wherein the plurality of unordered data points are captured by a LIDAR sensor or by a red green blue-depth (RGB-D) camera.

9. A method performed by one or more processors to implement a neural network, the method comprising:
receiving a plurality of unordered data points of a point cloud;
providing the plurality of unordered data points as a set of data points to be processed using a sequence of two or more feature extraction subsystems of the neural network, wherein execution each feature extraction subsystem includes:
processing the set of data points using a neural network layer to generate a plurality of multidimensional feature vectors arranged in a point-feature matrix having a plurality of rows and columns, each row of the point-feature matrix corresponding to a respective one of the multidimensional feature vectors, and each column of the point-feature matrix corresponding to a respective feature, the respective multidimensional feature vector represents a respective data point of the set of data points and includes a plurality of feature-correlated values each representing correlation extent of the respective feature;
processing the point-feature matrix using a critical point layer (CPL) to:
generate a reduced-max matrix having a selected plurality of feature-relevant vectors that is fewer in number than the plurality of multidimensional feature vectors in the point-feature matrix by:
identifying, for each column of the point-feature matrix, a multidimensional feature vector from the plurality of multidimensional feature vectors having a highest value; and
selecting, from a plurality of identified multidimensional feature vectors, the selected plurality of feature-relevant vectors to include in the reduced-max matrix;
wherein each row of the reduced-max matrix corresponds to a respective one of the feature-relevant vectors and each column of the reduced-max matrix corresponds to the respective feature of the point-feature matrix; and
output the reduced-max matrix;
wherein executing a given one feature extraction subsystem further includes:
providing the reduced-max matrix outputted by the given one feature extraction subsystem as the set of data points inputted to a subsequent feature extraction subsystem in the sequence of two or more feature extraction subsystems;
processing the reduced-max matrix outputted by a final feature extraction subsystem of the sequence of two or more feature extraction subsystems using a final layer of the neural network; and
processing output of the final layer by an object classification subsystem of the neural network to obtain a plurality of classified points.

10. The method of claim 9, wherein the CPL is applied to perform the selecting by:
generating an index vector containing row indices of the plurality of identified multidimensional feature vectors;
generating a sampled index vector by sampling the row indices in the index vector to a desired number; and
generating the reduced-max matrix using the row indices contained in the sampled index vector.

11. The method of claim 10, sampling the row indices in the index vector to a desired number is deterministic sampling, and the CPL is further applied to:
prior to the sampling, sort the row indices contained in the index vector in an ascending order.

12. The method of claim 10, wherein the desired number is predefined for performing batch processing for different respective point clouds.

13. The method of claim 10, wherein the CPL is further applied to:
prior to the sampling, removing any repetitions in the row indices contained in the index vector.

14. A system, comprising:
a non-transitory memory storage comprising instructions; and
one or more processors in communication with the memory, wherein the one or more processors execute the instructions to:
execute a sequence of two or more feature extraction subsystems, execution of each feature extraction subsystem including:
processing a set of data points using a neural network layer to generate a plurality of multidimensional feature vectors arranged in a point-feature matrix having a plurality of rows and columns, each row of the point-feature matrix corresponding to a respective one of the multidimensional feature vectors, and each column of the point-feature matrix corresponding to a respective feature, each multidimensional feature vector representing a respective unordered data point from a point cloud and including a respective plurality of feature-correlated values, each feature-correlated value representing a correlation extent of the respective feature;

processing the point-feature matrix using a critical point layer (CPL) to generate a reduced-max matrix having a selected plurality of feature-relevant vectors that is fewer in number than the plurality of multidimensional feature vectors in the point-feature matrix by:
identifying, for each column of the point-feature matrix, a multidimensional feature vector from the plurality of multidimensional feature vectors having a highest value; and
selecting, from a plurality of identified multidimensional feature vectors, the selected plurality of feature-relevant vectors to include in the reduced-max matrix;
wherein each row of the reduced-max matrix corresponds to a respective one of the feature-relevant vectors and each column of the reduced-max matrix corresponds to the respective feature of the point-feature matrix; and
outputting the reduced-max matrix;

wherein executing a given one feature extraction subsystem further includes:
providing the reduced-max matrix outputted by the given one feature extraction subsystem as the set of data points inputted to a subsequent feature extraction subsystem in the sequence of two or more feature extraction subsystems.

15. The system of claim 14, wherein the one or more processors further execute the instructions to perform the selecting by:
generating an index vector containing row indices of the plurality of identified multidimensional feature vectors;
generating a sampled index vector by sampling the row indices in the index vector to a desired number; and
generating the reduced-max matrix using the row indices contained in the sampled index vector.

16. The system of claim 15, wherein the sampling is deterministic, and the one or more processors further execute the instructions to:
prior to the sampling, sort the row indices contained in the index vector in an ascending order.

17. The system of claim 15, wherein the desired number is predefined for performing batch processing for different respective point clouds.

18. The system of claim 15, wherein the one or more processors further execute the instructions to:
prior to the sampling, remove any repetitions in the row indices contained in the index vector.

19. The system of claim 14, wherein the one or more processors further execute the instructions to output the reduced-max matrix outputted by a last feature extraction subsystem in the sequence of two or more feature extraction subsystems for processing by a final layer of a neural network by:
providing the reduced-max matrix, outputted by the last feature extraction subsystem, as input to the final layer of the neural network, the final layer being executed by the one or more processors to extract a desired number of represented features from each feature-relevant vector; and
provide the output of the final layer to an object classification subsystem of the neural network to classify the selected plurality of feature-relevant vectors.

20. The system of claim 14, wherein the one or more processors further execute the instructions to:
receive a plurality of unordered data points of a point cloud;
generate a plurality of transformed data by applying preliminary spatial transformation and filtering to the received unordered data points; and
provide the plurality of transformed data as the set of data points inputted to a first feature extraction subsystem in the sequence of two or more feature extraction subsystems.

* * * * *